T. C. DOBBINS.
REPAIR DEVICE FOR PNEUMATIC TIRES, &c.
APPLICATION FILED JUNE 24, 1913.
1,102,017.
Patented June 30, 1914.
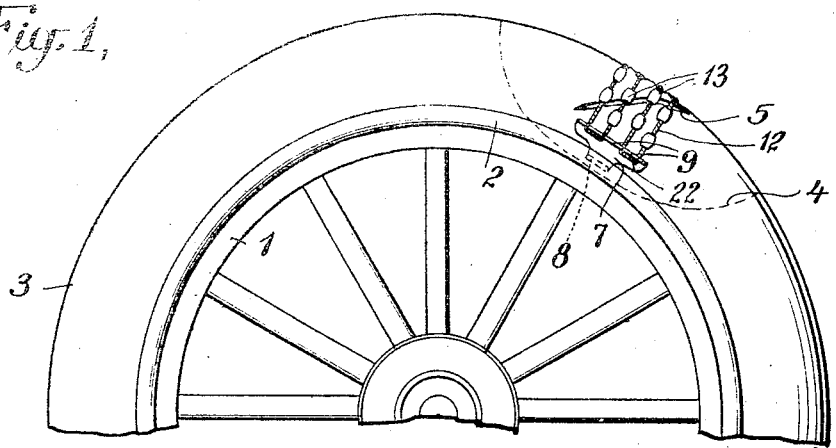
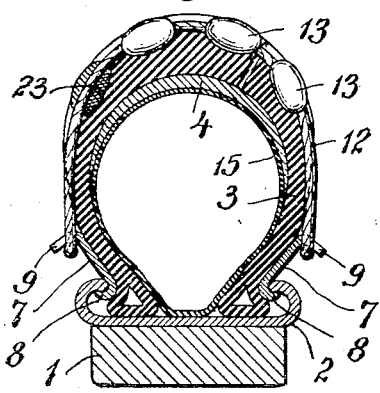
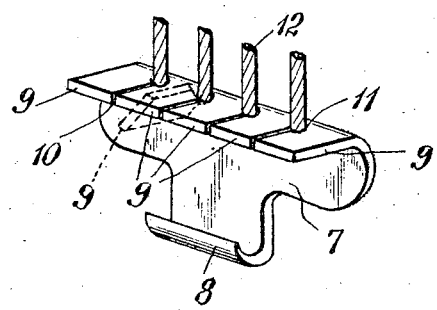
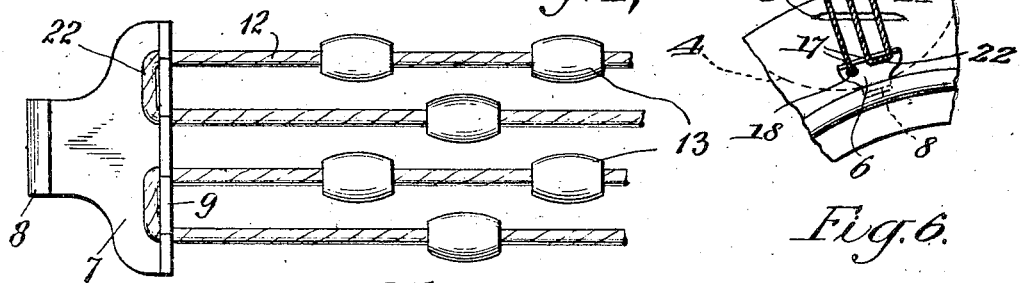
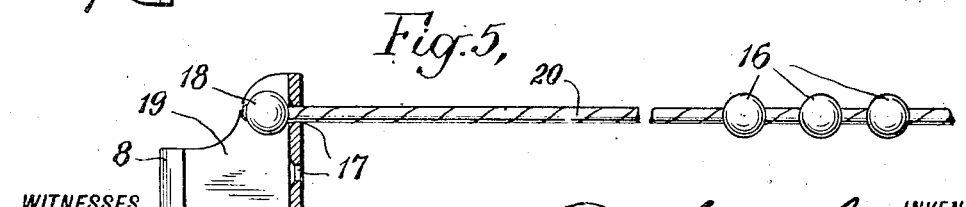
WITNESSES
Jessie B. Kay
Albert E. Shafer
INVENTOR
Timothy C. Dobbins
BY
Duncan & Duncan ATTORNEY

UNITED STATES PATENT OFFICE.

TIMOTHY C. DOBBINS, OF LOS ANGELES, CALIFORNIA, ASSIGNOR TO WEED CHAIN TIRE GRIP COMPANY, OF NEW YORK, N. Y., A CORPORATION OF NEW YORK.

REPAIR DEVICE FOR PNEUMATIC TIRES, &c.

1,102,017.  Specification of Letters Patent.  Patented June 30, 1914.

Application filed June 24, 1913. Serial No. 775,501.

*To all whom it may concern:*

Be it known that I, TIMOTHY C. DOBBINS, a citizen of the United States, and resident of Los Angeles, Los Angeles county, California, have made a certain new and useful Invention Relating to Repair Devices for Pneumatic Tires, &c., of which the following is a specification taken in connection with the accompanying drawing, forming part of the same.

This invention relates to repair devices for pneumatic tires comprising anchor plates preferably having central lips or hooks coöperating with the clencher rim and a series of flexible gripping securing cables or cords, with or without gripping enlargements, lumps or balls thereon, secured to said plates and adapted to embed themselves sufficiently in the pneumatic tire when it is inflated to securely hold it in position adjacent the puncture or blow-out, there being, if desired, a suitable patch of reinforced rubber or the like inserted between the tire shoe and its inner tube to reinforce the parts and minimize abrasion.

This application relating especially to cable or cord devices comprises subject matter taken from my copending application 623,613, filed April 27, 1911.

In the accompanying drawing showing in a somewhat diagrammatic manner an illustrative embodiment of this invention, Figure 1 shows a repair device applied to a pneumatic tire. Fig. 2 is an enlarged cross-section through the tire and one form of device; Fig. 3 is an enlarged perspective view of an anchor plate thereof. Fig. 4 is another view of such anchor plate and the connected parts of the device; Fig. 5 is a similar view of another form of the device, and Fig. 6 shows still another form of repair device applied to a pneumatic tire.

In the illustrative embodiment of the invention shown in the accompanying drawing the pneumatic tire 3 is shown as coöperating in the usual way with the clencher rim 2 mounted on the felly 1 of the wheel. This tire shoe is shown as having a large puncture or tear 5 therein and the repair patch 4 of reinforced rubber or the like is indicated as inserted within the tire shoe adjacent this puncture so as to reinforce the tire at this point and prevent the inner tube 15 from coming into injurious contact with the roughened shoe at the puncture.

The external repair device may as indicated comprise the two anchor plates 7, which may be formed of steel or other suitable material, and which are preferably curved to closely conform to the adjacent surface of the tire and preferably provided with relatively narrow centrally located holding devices of any desired character to have corresponding holding action on any part of the wheel and which may each be in the form of a suitable anchor lip or hook 8 to engage and securely hold upon the inturned flange of the clencher rim for instance when inserted between the shoe and rim when the tire is deflated.

A series of flexible securing members preferably formed of cord, that is, of woven or braided cord or textile material or metallic braided or twisted cord or cable may be connected in any desired way with the anchor plates preferably in a detachable manner. It is also desirable to provide suitable gripping irregularities or enlargements on the securing cords by forming thereon knots where feasible with more flexible cords or cables without undesirably impairing their strength or by securing on the cords separated lumps or balls of any suitable material, such as brass, steel or other metal.

As shown in Figs. 2 and 3, the securing members 12 may as indicated be formed of flexible metallic cable which may be conveniently attached to the anchor plates by forming therein suitable attaching holes such as 11 spaced apart at suitable intervals and communicating with the attaching slots 10. These slots as shown in Fig. 3 form a series of attaching tongues 9 in the edge of the anchor plates and when as is preferable these plates are formed of thin steel or other suitable material one or more of these attaching tongues can be forced out of place as by twisting it in the manner indicated in dotted lines in Fig. 3 so as to allow the insertion of the securing cables 12 or other form of securing members. When these tongues have been again bent into alinement the narrow slots then remaining prevent accidental displacement of the securing members which may be carried from one slot to another forming loops, such as 22, as shown in Fig. 1 for instance. In order to increase the grip of the securing members on the tire it is desirable in most cases to form thereon suitable gripping irregularities or enlargements, as for instance by securing thereto separated gripping balls or enlargements such as the ellipsoidal lumps 13 shown in Figs. 2 or 4. These lumps may be made of brass, galvanized iron or steel suitably protected, if desired, and may be conveniently attached to the securing cables by threading them thereon and then soldering or swaging them securely in place on the cables at the desired point, or if desired, these lumps may be formed with open slots communicating with the central hole therethrough so as to allow the enlargements to be slipped on to the cables at the desired point and then soldered thereon by the use of any suitable solder, such as 23, as shown in Fig. 2. It is also desirable in some cases to space these gripping irregularities or enlargements differently on the adjacent securing cables so that they are unsymmetrically spaced thereon as shown in Figs. 1 and 4 for example, this giving a more uniform and desirable gripping action.

Another arrangement is shown in Fig. 5 in which the anchor plate 19 is shown as provided with an attaching flange formed with wider attaching slots 17 substantially equal to the securing cables 20 and also with enlarged seats or recesses 27 to be engaged by the adjusting or attaching balls or lumps, such as 18, formed on the cables. It is possible by such means to conveniently adjust the effective length of these securing members 20 by forming on one or both ends a series of such adjusting balls or lumps, such as 16, which may be made of metal and secured permanently in position on the securing cables in any desired way so as to allow any one of them to be brought into engagement with the attaching recesses or seats in the anchor plates.

As shown in Fig. 6 it is not necessary in all cases that the securing cards or cables should be provided with any special knots or other attached spaced enlargements since desirable gripping holding action may be secured by the use of suitably braided or twisted metallic cord or cable, for instance, which may have a sufficiently close gripping engagement with the tire shoe for many purposes.

In repairing a weakened spot in the tire or an incipient blow-out therein, the tire repair device may be applied alone after deflating the tire without the necessity of using in all cases an inner patch of any kind. The anchor plates being secured in position in connection with the wheel as by being forcibly inserted in any way between the tire shoe and clencher flanges on each side of the tire and then on inflating the tire in the usual way, the closely spaced securing members extending across the tread of the tire become considerably embedded in the tire shoe and also force therein any gripping irregularities or enlargements on these securing members so that as is desirable in most cases the device is brought substantially flush with the tread surface of the tire to minimize bumping and wear. The securing members especially when provided with such gripping irregularities thus exert a strong securing and retaining action on the tire adjacent the punctured or weakened portion and not only prevent excessive working or movement of the parts with respect to the tire under service conditions, but also minimize the normal resilient movement of this part of the tire so as to correspondingly prevent further tire damage. By providing the anchor plates with relatively narrow central hooks or holding devices the plates are free to swing or oscillate slightly about such holding means as the repaired part of the tire moves into contact with the road surface so as to further minimize working or cutting.

In the case of punctures, the repair devices give best results when used in connection with an internal patch such as indicated and in this way a seriously damaged tire can be quickly and easily repaired without expert assistance so as to secure hundreds of miles of further service of the tire if necessary. It is also possible by the use of several such repair devices to use a pneumatic tire in which the shoe has been entirely severed in a more or less diagonal direction, while in the case of ordinary blow-outs the tire is so reinforced by the repair devices that this portion of the tire is apt to outlast the other portions of the same tire under normal conditions. Preferably as indicated in Fig. 1, the securing members whether used with or without special gripping projections or lumps are normally sufficiently embedded in the tire tread so as not to project to any appreciable extent beyond the normal tread surface which not only minimizes wear on these parts, but also gives a smoother action to the vehicle.

This invention has been described in connection with a number of illustrative embodiments, forms, proportions, materials and arrangements of parts, to the details of which disclosure the invention is not of course to be limited, since what is claimed as new and what is desired to be secured by Letters Patent is set forth in the appended claims.

I claim—

1. The tire repair device comprising a series of flexible cord securing members, connected anchoring plates each comprising a series of spaced attaching holes to accommodate said members, slots communicating with said holes to form adjustable attaching tongues substantially rigid under operating conditions and a central holding device adapted to coöperate with the wheel to hold the securing members in close gripping engagement with the adjacent portion of the pneumatic tire so as to hold the tire against undesirable movement.

2. The tire repair device comprising anchoring devices adapted to be secured to the wheel and coöperate with the sides of the tire and a series of spaced flexible metallic cable securing members connected to said anchoring devices and having secured thereon separated metallic gripping enlargements adapted to extend across the tread portion of the resilient tire to embed themselves therein under operating conditions, said gripping enlargements being differently spaced on adjacent securing members.

3. The tire repair device comprising anchoring devices adapted to be secured to the wheel and coöperate with the sides of the tire and a series of spaced flexible cord securing members connected to said anchoring devices and having thereon separated gripping enlargements adapted to extend across the tread portion of the resilient tire to embed themselves therein under operating conditions.

4. The tire repair device comprising anchoring devices adapted to be secured to the wheel and coöperate with the sides of the tire and a series of flexible cord securing members connected to said anchoring devices and adapted to extend across the tread portion of the resilient tire to embed themselves therein under operating conditions.

5. The combination with a wheel rim and a coöperating pneumatic tire, of a series of spaced flexible metallic cable securing members having secured thereon separated gripping enlargements unsymmetrically spaced on adjacent members and connected anchoring devices secured to the wheel on the sides of the tire to hold said securing members in close gripping engagement extending across the tread portion of the tire so as to be embedded therein and hold the same against undesirable movement.

6. The combination with a wheel rim and a coöperating pneumatic tire, of a series of spaced flexible cord securing members having thereon separated gripping enlargements and connected anchoring devices secured to the wheel on the sides of the tire to hold said securing members in close gripping engagement extending across the tread portion of the tire so as to be embedded therein and hold the same against undesirable movement.

TIMOTHY C. DOBBINS.

Witnesses:
PERCY C. MONTGOMERY,
RETA A. BROOM.